(No Model.)
G. LE BLANC & L. JOHNSON.
WHEEL FOR BICYCLES.
No. 546,593. Patented Sept. 17, 1895.
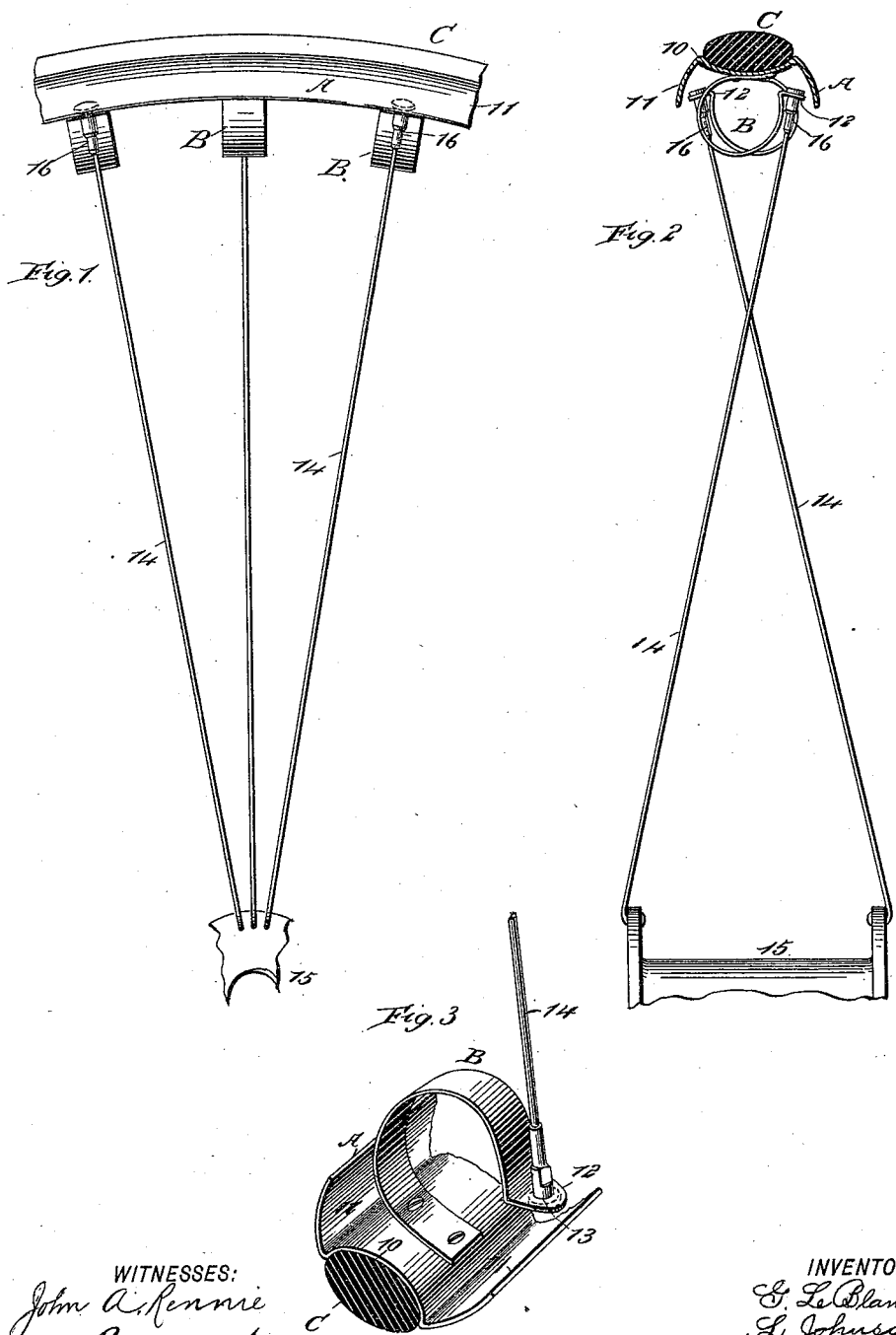
WITNESSES:
INVENTORS:
G. Le Blanc
L. Johnson
BY Munn & Co.
ATTORNEYS.

UNITED STATES PATENT OFFICE.

GUSTAVE LE BLANC AND LEANDER JOHNSON, OF MEAD, NEBRASKA.

WHEEL FOR BICYCLES.

SPECIFICATION forming part of Letters Patent No. 546,593, dated September 17, 1895.

Application filed June 10, 1895. Serial No. 552,327. (No model.)

*To all whom it may concern:*

Be it known that we, GUSTAVE LE BLANC and LEANDER JOHNSON, of Mead, in the county of Saunders and State of Nebraska, have invented a new and useful Improvement in Wheels for Bicycles and Like Vehicles, of which the following is a full, clear, and exact description.

Our invention relates to an improvement in vehicle-wheels, and the object of the invention is to provide a wheel which will possess a maximum degree of resiliency, being provided with a spring-controlled rim and tire adapted to be employed instead of the customary pneumatic tire; and a further object of this invention is to so construct the rim and the tire and connect the same with the hub of the wheel that the wheel will be given a maximum of strength, together with a minimum of weight, and whereby, also, the tire will be a solid rubber tire and so constructed that it will be reversible, not yielding in a detrimental manner under pressure.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a portion of a wheel having the improvement applied. Fig. 2 is a section through the tire and that portion of the wheel shown in Fig. 1, and Fig. 3 is a perspective view of a portion of the rim and tire of the wheel and one of the spokes.

In carrying out the invention the rim A of the wheel is provided with a concaved outer surface 10 and with an inwardly-directed marginal flange 11 of any desired width. A series of springs B is secured to the inner face of the body of the rim A. These springs, as shown in Fig. 3, are attached at one end by rivets or equivalent fastening devices to the tire, their opposite ends being curved over the fixed ends to form a bow or substantially circular spring, and the free end of each spring is provided with a horizontal lip 12, each lip having an aperture 13 made therein.

The springs between the flanges of the rim are wholly within the same, and alternate springs are reversely placed, their free ends facing in direction of opposite sides of the wheel. The spokes 14 are passed through the openings in the lips of the springs and are made to cross one another, as shown in Fig. 2, their inner ends being secured to the hub 15 of the wheel in any approved manner. The upper or outer ends of the spokes are provided with the usual nipple or nut 16, whereby the spokes may be lengthened or shortened, as required, to place the springs B under more or less tension.

The tire C is preferably solid and is made of rubber or equivalent material. This tire is substantially oval in cross-section and is fitted to the concavity 10 in the rim, whereby the tire may be reversed, the inner face being placed outward when the outer face has been unduly worn. Under this form of wheel a springy tire is obtained, and it has all the advantages of a pneumatic tire without the attendant disadvantages. The tire of the new wheel cannot be injured by punctures, an air-pump is not required, and as the wheel revolves under pressure the lower stretch of the wheel is not depressed unduly, thus requiring less power to propel the wheel. Again, the wheel is exceedingly light, yet durable and economic in its construction, and the springs adjust themselves to the action of the wheel, and automatically adjust themselves to the shifting of the weight along the periphery of the wheel.

It will be understood that a casing of canvas or other material may be employed to conceal the springs, in which event the casing may be attached to the flanges 11 of the rim and passed over a band placed adjacent to the inner faces of the springs, and it will also be understood that the springs may be covered themselves with any material adapted to protect them from the action of the elements.

Having thus described our invention, we claim as new and desire to secure by Letters Patent—

1. In a vehicle wheel, a rim, springs attached at one end to the rim, their opposite ends being free, the free ends of alternate springs facing opposite sides of the wheel, and spokes attached to the hub of the wheel and to the free ends of the springs, whereby the spokes cross one another, as and for the purpose set forth.

2. In a vehicle wheel, a rim having a concave outer surface, and provided with inwardly extending marginal flanges, springs having one end secured to the body of the rim between the flanges thereof, and spokes secured directly to the free ends of the springs, substantially as described.

3. In a wheel for bicycles and like purposes, a rim having a circumferential channel, a cushioned tire secured in the channel of the rim, bow springs secured at one of their ends to the under face of the rim, the free ends of opposing springs facing opposite sides of the wheel, and adjustable spokes attached to the free ends of the springs and to the hub of the wheel, whereby the said spokes cross one another, as and for the purpose set forth.

4. In a bicycle wheel, a rim, a hub, spokes connected with the hub, and springs attached to the rim and to the spokes, alternate springs yielding in direction of opposite faces of the wheel, as and for the purpose specified.

GUSTAVE LE BLANC.
LEANDER JOHNSON.

Witnesses:
AUGUST OAKESON,
WILLIAM PHELAN.